(12) United States Patent
Craig et al.

(10) Patent No.: US 9,655,012 B2
(45) Date of Patent: May 16, 2017

(54) DERIVING A WLAN SECURITY CONTEXT FROM A WWAN SECURITY CONTEXT

(71) Applicant: QUALCOMM Incorporated, San Diego, CA (US)

(72) Inventors: David William Craig, San Diego, CA (US); Gavin Bernard Horn, La Jolla, CA (US); Anand Palanigounder, San Diego, CA (US); Arnaud Meylan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 11 days.

(21) Appl. No.: 14/133,208

(22) Filed: Dec. 18, 2013

(65) Prior Publication Data

US 2014/0181904 A1    Jun. 26, 2014

Related U.S. Application Data

(60) Provisional application No. 61/740,870, filed on Dec. 21, 2012.

(51) Int. Cl.
*H04W 36/00* (2009.01)
*H04W 12/04* (2009.01)
(Continued)

(52) U.S. Cl.
CPC ....... *H04W 36/0038* (2013.01); *H04W 12/04* (2013.01); *H04L 2463/061* (2013.01);
(Continued)

(58) Field of Classification Search
CPC ............. H04W 36/00; H04W 36/0005; H04W 36/0055; H04W 36/0083; H04W 36/0011;
(Continued)

(56) References Cited

U.S. PATENT DOCUMENTS

2007/0249352 A1* 10/2007 Song et al. ............. 455/436
2008/0301434 A1* 12/2008 Haddad et al. .......... 713/153
(Continued)

FOREIGN PATENT DOCUMENTS

EP          2007160 A1   12/2008
WO     WO-2007049936 A1    5/2007

OTHER PUBLICATIONS

Blom et al., Security in the Evolved Packet System, Ericsson, Ericsson Review, 2010, pp. 4-9 Retrieved from www.ericsson.com.*

(Continued)

*Primary Examiner* — Jung Kim
*Assistant Examiner* — Adrian Stoica
(74) *Attorney, Agent, or Firm* — Patterson & Sheridan, L.L.P.

(57) ABSTRACT

Techniques for deriving a WLAN security context from an existing WWAN security context are provided. According to certain aspects, a user equipment (UE) establishes a secure connection with a wireless wide area network (WWAN). The UE may receive from the WWAN an indication of a wireless local area network (WLAN) for which to derive a security context. The UE then derives the security context for the WLAN, based on a security context for the WWAN obtained while establishing the secure connection with the WWAN and establishes a secure connection with the WLAN using the derived security context for the WLAN. This permits the UE to establish a Robust Security Network Association (RSNA) with the WLAN while avoiding lengthy authentication procedures with an AAA server, thus speeding up the association process.

30 Claims, 8 Drawing Sheets

(51) Int. Cl.
  *H04W 88/06* (2009.01)
  *H04W 84/12* (2009.01)
  *H04W 36/14* (2009.01)
(52) U.S. Cl.
  CPC ............ *H04W 36/14* (2013.01); *H04W 84/12* (2013.01); *H04W 88/06* (2013.01)
(58) Field of Classification Search
  CPC ......... H04W 36/0016; H04W 36/0022; H04W 36/0033; H04W 36/0038; H04W 12/00; H04W 12/04; H04W 12/08; H04L 12/00; H04L 12/28; H04L 12/46; H04L 12/4633; H04L 12/64; H04L 12/6418; H04L 12/06; H04L 12/66
  See application file for complete search history.

(56) References Cited

U.S. PATENT DOCUMENTS

| | | | |
|---|---|---|---|
| 2009/0285176 A1 | 11/2009 | Zheng et al. | |
| 2009/0323635 A1* | 12/2009 | Gras et al. | 370/331 |
| 2010/0002883 A1* | 1/2010 | Sammour et al. | 380/272 |
| 2010/0254533 A1 | 10/2010 | McCullough et al. | |
| 2011/0105124 A1* | 5/2011 | Hapsari | H04L 9/083 455/436 |
| 2011/0130119 A1 | 6/2011 | Gupta et al. | |
| 2011/0235802 A1 | 9/2011 | Kokkinen et al. | |
| 2013/0007858 A1* | 1/2013 | Shah et al. | 726/6 |
| 2013/0095789 A1* | 4/2013 | Keevill et al. | 455/411 |
| 2013/0166910 A1 | 6/2013 | Wilkinson et al. | |
| 2013/0195268 A1* | 8/2013 | Norrman et al. | 380/247 |
| 2013/0246783 A1 | 9/2013 | Ho et al. | |

OTHER PUBLICATIONS

International Search Report and Written Opinion—PCT/US2013/076503—ISA/EPO—Apr. 3, 2014.
NTT DOCOMO et al., "Proposed architecture for inter access system handover between 3GPP and non-3GPP access systems", 3GPP Draft; S2-060484, 3rd Generation 20060119, Jan. 19, 2006, pp. 1-6, XP050254794, [retrieved on Jan. 19, 2006] p. 3, line 1—p. 4, last line.
Samsung: "Security context transfer for handover between 3GPP and trusted non 3GPP networks", 3GPP Draft; S2-071821 Inter Rat SCT, 3rd Generation Partnership Sophia-Antipolis Cedex; France, vol. SA WG2, No. Beijing; 20070418, Apr. 18, 2007, 6 pages, XP050259570, [retrieved on Apr. 18, 2007] the whole document.

* cited by examiner

DERIVING A WLAN SECURITY CONTEXT FROM A WWAN SECURITY CONTEXT

CLAIM OF PRIORITY UNDER 35 U.S.C. §119

This application claims benefit of U.S. Provisional Patent Application Ser. No. 61/740,870, filed Dec. 21, 2012, which is herein incorporated by reference in its entirety.

BACKGROUND

Field

Certain aspects of the present disclosure relate to wireless communications and, more particularly, to deriving a wireless local area network (WLAN) security context from an existing wireless wide area network (WWAN) security context for a mobile node for establishing a secure association with the WLAN.

Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-single-out or a multiple-in-multiple-out (MIMO) system.

A MIMO system employs multiple (NT) transmit antennas and multiple (NR) receive antennas for data transmission. A MIMO channel formed by the NT transmit and NR receive antennas may be decomposed into NS independent channels, which are also referred to as spatial channels. Each of the NS independent channels corresponds to a dimension. The MIMO system can provide improved performance (e.g., higher throughput and/or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

SUMMARY

Certain aspects provide a method for secure wireless communications by a user equipment (UE). The method generally includes establishing a secure connection with a wireless wide area network (WWAN), deriving a security context for a wireless local area network (WLAN), based on a security context for the WWAN and establishing a secure association with the WLAN using the derived security context for the WLAN.

Certain aspects provide a method for secure wireless communications by a base station of a wireless wide area network (WWAN). The method generally includes establishing a secure connection with a UE and communicating with a base station of a wireless local area network (WLAN) in order to derive a security context for the UE with the WLAN, based on a security context for the WWAN.

Certain aspects provide a method for secure wireless communications by a an access point of a wireless local area network (WLAN). The method generally includes communicating with a base station of a wireless wide area network (WWAN) in order to derive a security context for the UE for the WLAN, based on a security context of the UE for the WWAN, receiving a request to establish a secure association from a UE, and establishing the secure association with the UE using the derived security context for the WLAN.

Certain aspects provide an apparatus for secure wireless communications by a user equipment (UE). The apparatus generally includes means for establishing a secure connection with a wireless wide area network (WWAN); means for deriving a security context for a wireless local area network (WLAN), based on a security context for the WWAN; and means for establishing a secure association with the WLAN using the derived security context for the WLAN.

Certain aspects provide an apparatus for secure wireless communications by a user equipment (UE). The apparatus generally includes at least one processor configured to establish a secure connection with a wireless wide area network (WWAN); derive a security context for a wireless local area network (WLAN), based on a security context for the WWAN; and establish a secure association with the WLAN using the derived security context for the WLAN. The apparatus generally also includes a memory coupled with the at least one processor.

Certain aspects provide a computer program product for secure wireless communications by a user equipment (UE). The computer program product generally includes a computer readable medium having instructions stored thereon for: establishing a secure connection with a wireless wide area network (WWAN); deriving a security context for a wireless local area network (WLAN), based on a security context for the WWAN; and establishing a secure association with the WLAN using the derived security context for the WLAN.

Certain aspects provide an apparatus for secure wireless communications by a base station of a wireless wide area network (WWAN). The apparatus generally includes means for establishing a secure WWAN connection with a user equipment (UE) and means for communicating with an access point of a wireless local area network (WLAN) in order to derive a security context for the UE with the WLAN, based on a security context for the WWAN.

Certain aspects provide an apparatus for secure wireless communications by a base station of a wireless wide area network (WWAN). The apparatus generally includes at least one processor configured to establish a secure WWAN connection with a user equipment (UE) and communicate with an access point of a wireless local area network (WLAN) in order to derive a security context for the UE with the WLAN, based on a security context for the WWAN. The apparatus generally also includes a memory coupled with the at least one processor.

Certain aspects provide a computer program product for secure wireless communications by a base station of a wireless wide area network (WWAN). The computer program product generally includes a computer readable medium having instructions stored thereon for establishing a secure WWAN connection with a user equipment (UE) and communicating with an access point of a wireless local area network (WLAN) in order to derive a security context for the UE with the WLAN, based on a security context for the WWAN.

Certain aspects provide an apparatus for secure wireless communications by a an access point of a wireless local area network (WLAN). The apparatus generally includes means for communicating with a base station of a wireless wide area network (WWAN) in order to derive a security context for a user equipment (UE) for the WLAN, based on a security context of the UE for the WWAN; means for receiving a request to establish a secure association from the UE; and means for establishing the secure association with the UE using the derived security context for the WLAN.

Certain aspects provide an apparatus for secure wireless communications by a an access point of a wireless local area network (WLAN). The apparatus generally includes at least one processor configured to: communicate with a base station of a wireless wide area network (WWAN) in order to derive a security context for a user equipment (UE) for the WLAN, based on a security context of the UE for the WWAN; receive a request to establish a secure association from the UE; and establish the secure association with the UE using the derived security context for the WLAN. The apparatus generally also includes a memory coupled with the at least one processor.

Certain aspects provide a computer program product for secure wireless communications by a an access point of a wireless local area network (WLAN). The computer program product generally includes a computer readable medium having instructions stored thereon for: communicating with a base station of a wireless wide area network (WWAN) in order to derive a security context for a user equipment (UE) for the WLAN, based on a security context of the UE for the WWAN; receiving a request to establish a secure association from the UE; and establishing the secure association with the UE using the derived security context for the WLAN.

Certain aspects of the present disclosure also provide apparatuses and program products for performing the operations described above.

DETAILED DESCRIPTION

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

Figure 1:
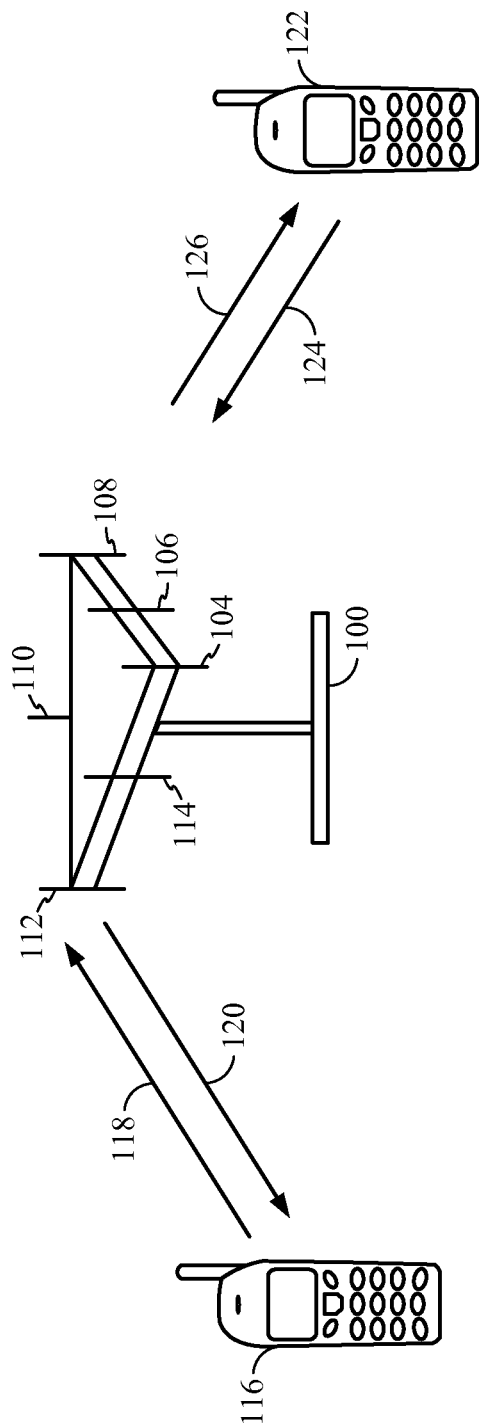
FIG. 1 illustrates an example multiple access wireless communication system, in accordance with certain aspects of the present disclosure.

Referring to FIG. 1, a multiple access wireless communication system according to one embodiment is illustrated, in accordance with certain aspects of the present disclosure. An access point 100 (AP) may include multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access point. In the embodiment, antenna groups each are designed to communicate to access terminals in a sector, of the areas covered by access point 100.

In communication over forward links 120 and 126, the transmitting antennas of access point 100 utilize beamforming in order to improve the signal-to-noise ratio of forward links for the different access terminals 116 and 124. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as an access point, a Node B, an evolved Node B (eNode B), or some other terminology. An access terminal may also be called an access terminal, user equipment (UE), a wireless communication device, wireless node, terminal, or some other terminology.

Figure 2:
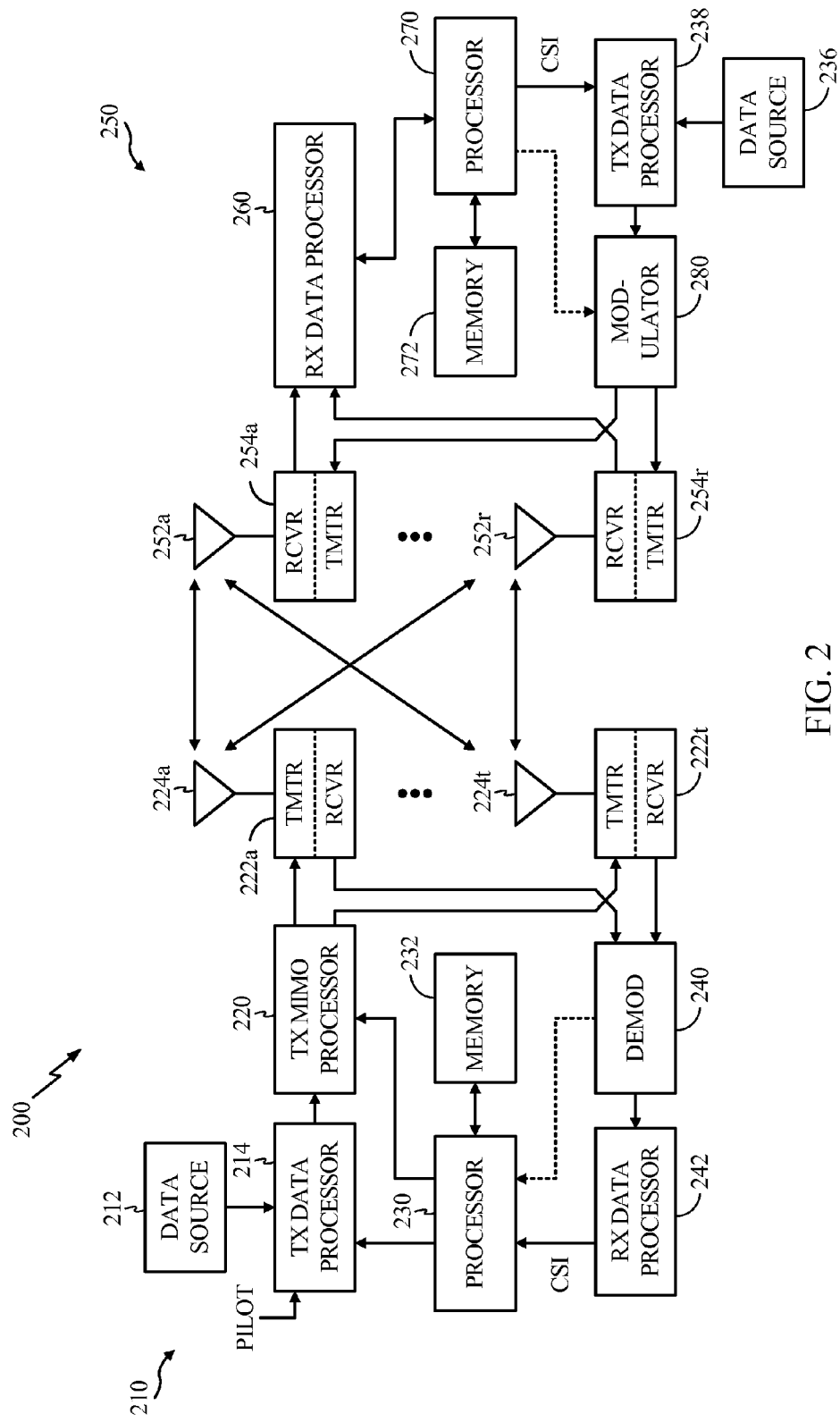
FIG. 2 illustrates a block diagram of an example wireless communication, in accordance with certain aspects of the present disclosure.

FIG. 2 is a block diagram of an embodiment of a transmitter system 210 (also known as the access point) and a receiver system 250 (e.g., an access terminal, UE or wireless node) in a MIMO system 200, in accordance with certain aspects of the present disclosure. At the transmitter system 210, traffic data for a number of data streams is provided from a data source 212 to a transmit (TX) data processor 214.

In an embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides NT modulation symbol streams to NT transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. NT modulated signals from transmitters 222a through 222t are then transmitted from NT antennas 224a through 224t, respectively.

At receiver system 250, the transmitted modulated signals are received by NR antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the NR received symbol streams from NR receivers 254 based on a particular receiver processing technique to provide NT "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

In an aspect, logical channels are classified into Control Channels and Traffic Channels. Logical Control Channels comprises Broadcast Control Channel (BCCH) which is DL channel for broadcasting system control information. Paging Control Channel (PCCH) which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. In aspects, Logical Traffic Channels comprises Dedicated Traffic Channel (DTCH) which is Point-to-point bi-directional channel, dedicated to one UE, for the transfer of user information. Also, a Multicast Traffic Channel (MTCH) for Point-to-multipoint DL channel for transmitting traffic data.

In an aspect, Transport Channels are classified into DL and UL. DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprises a Random Access Channel (RACH), a Request Channel (REQCH), a Uplink Shared Data Channel (UL-SDCH) and a plurality of PHY channels. The PHY channels comprises a set of DL channels and UL channels.

The DL PHY channels may comprise, for example, a Common Pilot Channel (CPICH), Synchronization Channel (SCH), Common Control Channel (CCCH), Shared DL Control Channel (SDCCH), Multicast Control Channel (MCCH), Shared UL Assignment Channel (SUACH), Acknowledgement Channel (ACKCH), DL Physical Shared Data Channel (DL-PSDCH), UL Power Control Channel (UPCCH), and a Paging Indicator Channel (PICH), Load Indicator Channel (LICH).

The UL PHY Channels may comprise, for example, a Physical Random Access Channel (PRACH), Channel Quality Indicator Channel (CQICH), Acknowledgement Channel (ACKCH), Antenna Subset Indicator Channel (ASICH), Shared Request Channel (SREQCH), UL Physical Shared Data Channel (UL-PSDCH), and Broadband Pilot Channel (BPICH).

Deriving a WLAN Security Context from a WWAN Security Context

A user equipment (UE) (e.g., UE 250) including station (STA) capability may wish to associate with an access point (AP) (e.g., AP 210). In other words, such STA capability may allow a UE to perform operations as those performed by a conventional station in a wireless local area network (WLAN). In the following discussion, this functionality may be referred to as a "STA within a UE." In order to ensure a secure connection, an enterprise-grade Robust Secure Network Association (RSNA) should be established. Conventionally, a RSNA for service-grade or enterprise-grade security requires the mobile node to authenticate with an authentication, authorization, and accounting (AAA) server to centralize management. The authentication procedure authenticates the mobile node to the network as well as authenticating the network to the mobile node with a 4-way handshake. The AP encapsulates the requests to the AAA server (e.g., using RADIUS or DIAMETER protocols). There are network and processing delays associated with the 4-way handshake to implement the mutual authentication.

Figure 3:
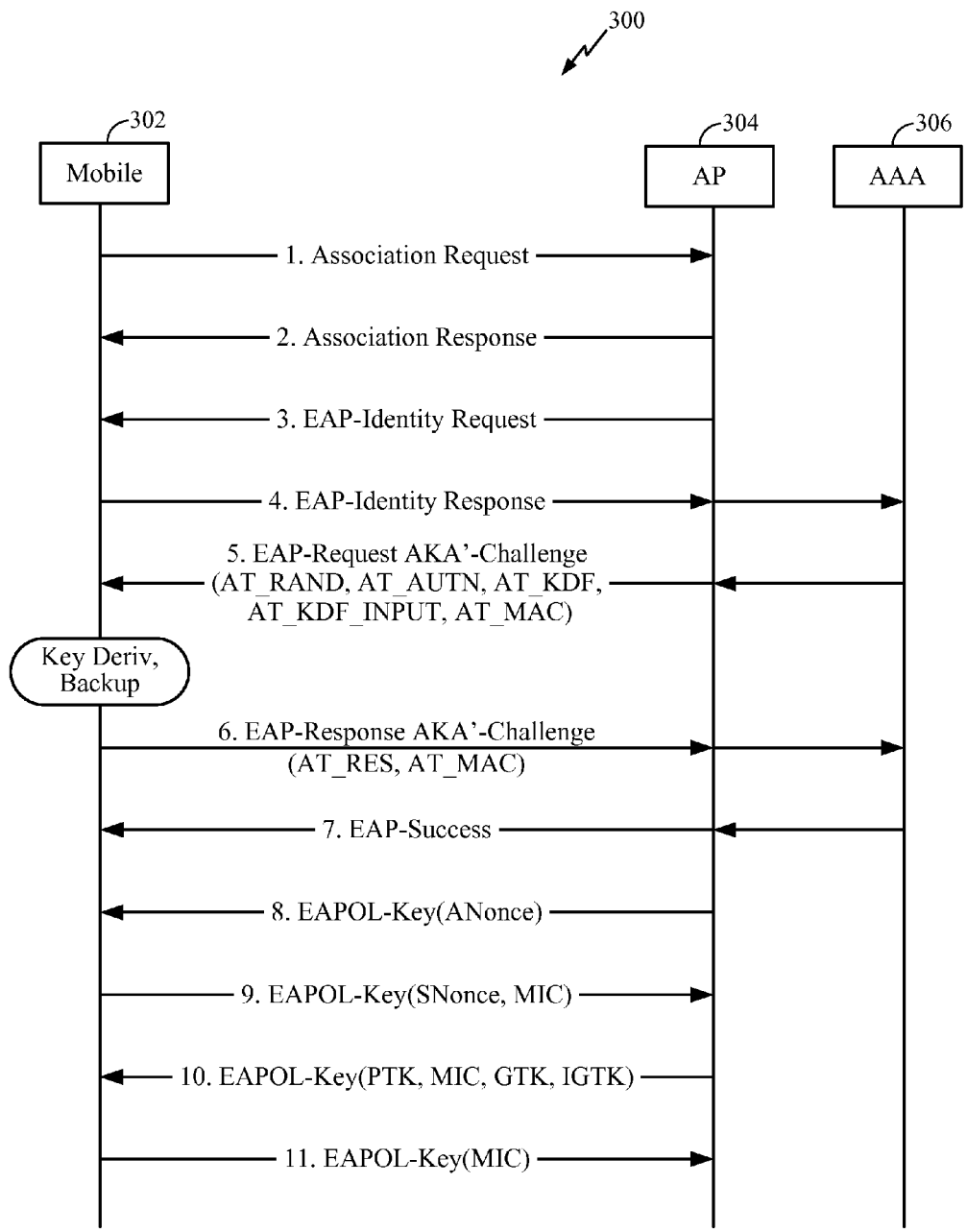
FIG. 3 illustrates an example wireless local area network (WLAN) association and key exchange between a user equipment (UE), access point (AP), and authentication, authorization, and accounting (AAA) server, in accordance with certain aspects of the present disclosure.

FIG. 3 illustrates a conventional call flow 300 for an association procedure between a mobile node 302 and an AP 304 for a UE STA that has already obtained a probe response for the AP, in accordance with certain aspects of the present disclosure. As shown in FIG. 3, the association setup starts, at 1, with the association request from the mobile node 302 to the AP 304 and the association response, at 2, from the AP 304 to the mobile node 302. The association request and association response select the cipher and authentication suites advertised by the AP 304 and supported by the UE STA 302. The association request advertises the UE STA's quality of service (QoS) and power save capabilities to the AP 304. The association response confirms the capabilities that the AP 304 can use by selecting those which are supported and echoing them back in the response message.

The AP 304 then initiates the extensible authentication protocol (EAP) procedure for mutual authentication, at 3, by specifying to the mobile node 302 the EAP method the mobile node 302 should use for setting up a RSNA in an EAP-identity request message. The authentication identified in the EAP-identity request message can vary depending on the authentication method supported and configured within the AP 304 and AAA server 306. In the example shown in FIG. 3, the network selects the EAP-AKA authentication method. The mobile node 302 responds with its identity or pseudonym, at 4, in the EAP-identity response message. The authentication procedure continues, at 5, with EAP-request AKA-challenge message and response at 6. Messages 5 and 6 between the mobile node 302 and the AAA server 306 set up session keys to protect further communication between the mobile node 302 and the AP 304. At 7, AAA server 306 sends a EAP-success message to the mobile node 302 via AP 304.

The mobile node 302 and the AP 304 then exchange a four-way handshake in messages 8-11 to complete setup of the temporal keys used in protecting the RSNA traffic. The messages preceding the association request at 1 between the mobile node 302 and AP 304 aid in selecting the appropriate transmission rates, high-level quality of service and security capabilities supported, and etc. These messages, however, do not contribute a significant source of delay in the association process.

As noted above, the association process between the mobile node and the AAA server generates considerable delay. Long association delay hampers both the reliability of the network as well as network availability. In one scenario, a mobile node may timeout the association process and attempt associating with many access points. When network outage for a new association is long enough for application-layer or transport-layer timeouts, the decreased network reliability is apparent to an end user running applications within the mobile node.

Techniques are provided herein for an association procedure. The procedure includes establishing a security context in a network by deriving the security context from an existing security context in another network. The proposed techniques may avoid negotiating separate WLAN security or the AP exchanging messages with the core network AAA server when connecting to WLAN that shares a secure network with a cellular base station.

Figure 4:
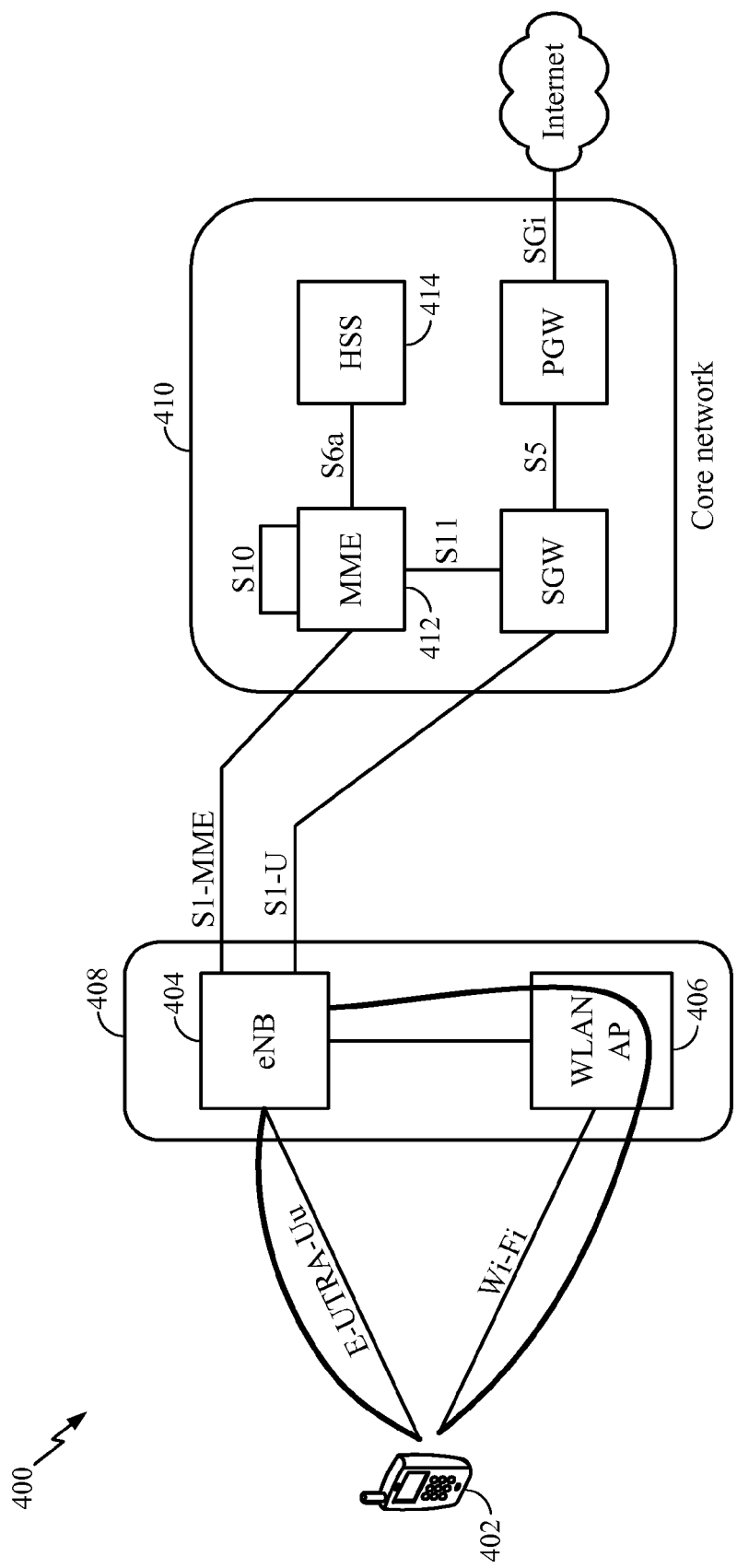
FIG. 4 illustrates a collocated WLAN and evolved Node B (eNB) architecture, in accordance with certain aspects of the present disclosure.

FIG. 4 illustrates an example architecture 400 for a collocated wireless local area network (WLAN) access point (AP) 406 and eNode B (eNB) 404, in accordance with certain aspects of the present disclosure. As shown in FIG. 4, a UE 402 may be connected with an eNB 404 in a wireless wide area network (WWAN) and its STA connected with an AP 406 in a WLAN. The WLAN AP 406 and WWAN eNB 404 may be collocated at location 408 such that there is a fast, secured link between the nodes. In some implementations, the conventional authentication procedure for the UE's STA between the AP 406 and the home subscriber service (HSS) 414 or a AAA server in the core network 410 may be avoided when setting up a new RSNA.

According to certain aspects, a low-latency link between the WWAN eNB 404 and WLAN AP 406 may permit the eNB 404 to configure a WLAN association in the WLAN AP 406 in advance of the EUTRAN signaling over the air to the UE 402 to use the WLAN association. The link between the WWAN eNB 404 and WLAN AP 406 may enable the WWAN eNB 404 to setup the necessary access network keys for a RSNA between the STA in UE 402 and WLAN AP 406. When more than one WWAN security context exists, a key index may be used to indicate which security context to use (e.g., (evolved) key set identifier (KSI)).

According to certain aspects, the initial WLAN association may use a key generated from an eNB key. For example, the eNB 404 may receive an eNB key as a part of the UE context when the UE 402 establishes a connection. The eNB key may then be used to generate a Pairwise Master Key (PMK) for use with the WLAN AP 406. The eNB key and the PMK may each be 256-bits. The PMK may be generated, for example, using a Key Derivation Function (KDF) and may use the eNB as one of the inputs. The KDF may be a one-way function, meaning it may be easy to compute the output of the KDF, but computing the input used to produce a particular output may be computationally difficult. This may mean that the eNB providing a PMK may not appreciably reduce the security of its eNB key. PMK values may be derived from the eNB key by including additional information such as nonce(s), sequence numbers, WLAN AP ID, etc. Because the eNB key may be a symmetric key, both the eNB 404 and UE 402 may symmetrically generate the PMK.

According to certain aspects, an access security management entity (ASME) key or a similar WWAN session key available in the core network 410 that is available to both the UE 402 and the core network node, such as the MME 412, may be used instead of the eNB key to derive the keys required for securing WLAN association. In such cases, the core network node may deliver the derived key(s) to the eNB 404 (e.g., using the S1 interface).

According to certain aspects, the PMK may be refreshed by reusing the procedure used for authentication for reauthentication whenever the eNB key is changed at the eNB 404. In certain embodiments, the UE 402 may relinquish the WLAN association with the existing WLAN AP 406 when handing off to another eNB.

The ability to derive the PMK may enable the WLAN AP 406 hosted in eNB 404 and the attached UE 402 to always have a valid key for associating, thus, enabling the STA within the UE to bypass the conventional WLAN EAP authentication procedures illustrated in FIG. 3 as messages 3 through 7.

Figure 5:
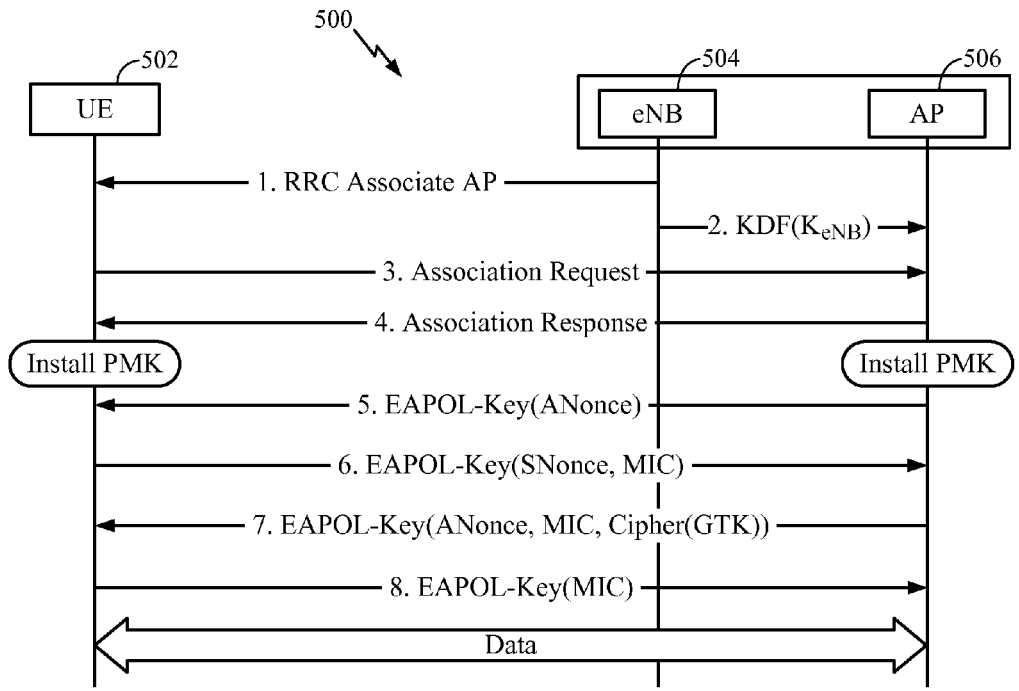
FIG. 5 illustrates an example radio resource control (RRC) connection and key exchange call flow between a UE and an AP, in accordance with certain aspects of the present disclosure.

FIG. 5 illustrates an example call flow 500 for setting up an association with a WLAN AP 504 (e.g., similar to WLAN AP 404) using a WWAN security context to derive a security context for the WLAN AP 504, in accordance with certain aspects of the present disclosure. Although not shown in FIG. 5, a Probe Request and Probe Response may be initially performed by the STA within UE 502 (e.g., similar to UE 402) and AP 504 respectively (e.g., as part of UE 502 discovering the reachability of the AP 504). As shown in FIG. 5, at 1, the eNB 504 may instruct the STA within UE 502 to associate with a particular AP 506 in an RRC Associate AP message. According to certain aspects, the RRC Associate AP message may contain an identifier for the AP 506 (e.g., a basic service set ID (BSSID), service set ID (SSID), or homogenous service set ID (HESSID)) and a channel identifier for the AP 506 to associate with. The RRC Associate AP message may not contain the PMK, but may include an identifier indicating the WWAN security context associated with the eNB key that the UE 502 should use for deriving the WLAN security context for the AP association (e.g., the WWAN security context that was established when the UE 502 established a connection with the eNB 504). For certain embodiments, the RRC Associate AP message may be sent to direct the UE 502 to have its STA re-associate with the AP 506, for example if the UE 502 has dropped an association.

According to certain aspects, at 2, the eNB 504 may pass a 256-bit PMK derived from the eNB key or another key from the EUTRAN, for example a key derived using a KDF. For certain embodiments, the AP may start a timer to refresh the PMK if the UE 502 does not associate. According to certain aspects, the UE 502 may be required to derive the PMK using the same KDF. According to certain aspects, the PMK may be refreshed in the AP 506 and UE 502 when the WWAN security context changes.

According to certain aspects, at 3, the STA within UE 502 may issue an Association Request message to the AP 506 that may select the unicast and multicast cipher suite and authentication modes advertised by the AP 506 in its Beacon or Probe Response. The UE 502 may communicate the selection in a Wi-Fi Protected Access (WPA) Information Element (IE). At 4, the AP 506 may acknowledge the UE's selections with a successful Association Response message.

According to certain aspects, in messages 5-8 (e.g., EAPOL-Key (ANonce), EAPOL-Key (SNonce, MIC), EAPOL-Key (ANonce, MIC, Cipher (GTK)), and EAPOL-Key (MIC)), a 4-way EAP handshake over LAN may begin to setup temporal keys used in protecting WLAN traffic. For example, at 5, the AP 5-6 may exchange the Authenticator's nonce (ANonce) generated by the AP 506 to prevent replay attacks. At 6, the STA within UE 502 may respond with the UE's Supplicant nonce (SNonce) for the same purpose with a Message Integrity Code (MIC) using a Pairwise Temporal Key (PTK). For certain embodiments, the PTK may be generated by the STA within UE 502 using the received ANonce, the generated SNonce, and the medium access control (MAC) addresses of the two hosts. At 7, the AP 506 may verify the message 6 by recomputing the MIC after computing the PTK. The STA within UE 502 may respond by resending its nonce for replay protection with the Group Temporal Key (GTK) as well as a copy of the WPA in the payload. The message may include a MIC that indicates all of the keys installed in the STA within UE 502. At this point, the AP 506 may transmit protected frames to the UE 502.

According to certain aspects, if the eNB key refreshes during the association procedure, the EAPOL handshake may fail and the eNB may repeat the procedure. For certain embodiments, a PMK with a longer lifetime than the eNB key may be generated.

Figure 6:
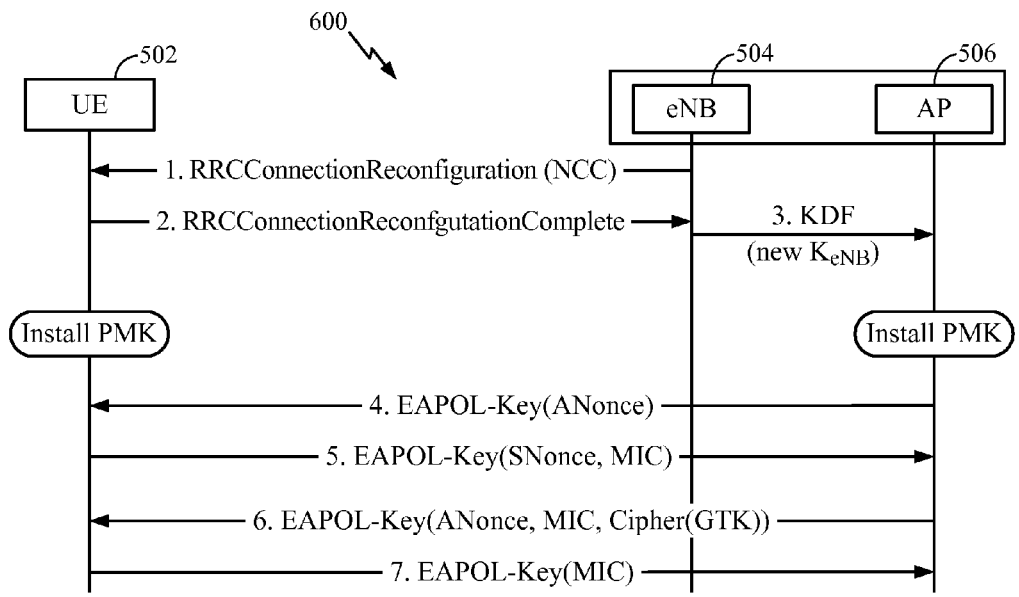
FIG. 6 illustrates an example key refresh call flow in RRC connected mode, in accordance with certain aspects of the present disclosure.

FIG. 6 illustrates an example call flow 600 for refreshing a WLAN AP security context, in accordance with certain aspects of the present disclosure. As shown in FIG. 6, at 1, after the eNB key at the eNB 504 is changed, the eNB 504 may notify the UE 502 of the new eNB key via a RRC Connection Reconfiguration message. At 2, the UE 502 may send a RRC Connection Reconfiguration Complete message to eNB 504 to confirm the reconfiguration and derive a new eNB key. The RRC Connection Reconfiguration Complete message may indicate to the eNB 504 that it can send the new derived PMK key to the AP 506, at 3, for rekeying the WLAN association. The UE 502 may then update its PMK and prepare for a 4-way handshake using the new PMK when it is also connected to the WLAN AP 506 in messages 4-7. The eNB 504 may then notify the AP 506 of a new PMK when it obtains a new eNB key. At 4, the AP 506 may start with the PTK from the previous EAP 4-way handshake until deriving a new PTK during messages 4-7. Once the exchange is complete, communications may be resumed.

Figure 7:
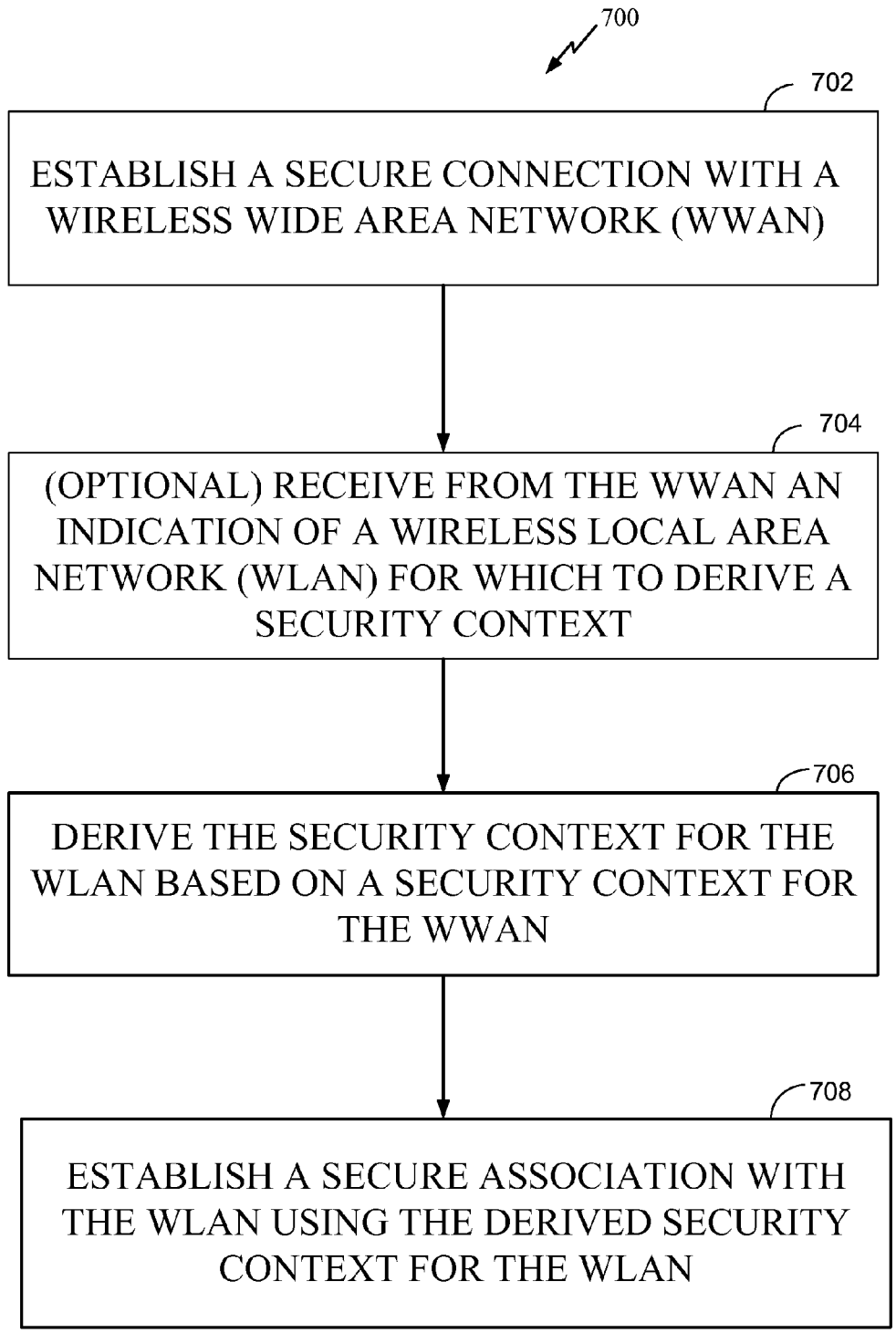
FIG. 7 illustrates example operations for secured wireless communications performed, for example, by a UE, in accordance with certain aspects of the present disclosure.

For certain embodiments, the indication to reuse a WWAN security context may be sent as a vendor specific extension. For certain embodiments, a WPA may be used for securing traffic using the derived PMK as the root for deriving temporal keys FIG. 7 illustrates example operations 700 for secure wireless communications, in accordance with certain aspects of the present disclosure. The operations 700 may be performed, for example, by a UE (e.g., UE 402 shown in FIG. 4). The operations 700 may begin, at 702, by establishing a secure connection with a WWAN.

At 704, the UE may receive from the WWAN an indication of the WLAN for which to derive a security context. The UE may obtain the specific WLAN network to associate with as well as the WWAN security context to use for deriving the WLAN security context.

At 706, the UE derives a security context for a WLAN, based on a security context for the WWAN setup in 702. The security context for the WWAN network connection may be an eNB key or ASME key. For certain embodiments, the security context for the WLAN RSNA may be a PMK derived from the eNB key or ASME key using a KDF. Alternatively, a WPA may be used for securing traffic using the derived PMK as the root for deriving temporal keys.

At 708, the UE, via the STA within the UE, establishes a secure association, for example, a RSNA, with the WLAN using the derived PMK for the WLAN. According to certain aspects, the UE may receive a message from a WWAN node requesting the UE to establish the secure association. The message may also indicate that the WLAN security context should be derived from the WWAN security context. For example, the indication may be a vendor specific extension.

As mentioned above, if the security context changes, the UE may derive a new PMK. The context may changes, for example, in response to the WWAN node generating a new context or a key from the new security context created within the WWAN. The new PMK may be derived from the new WWAN security context using a KDF.

Figure 8:
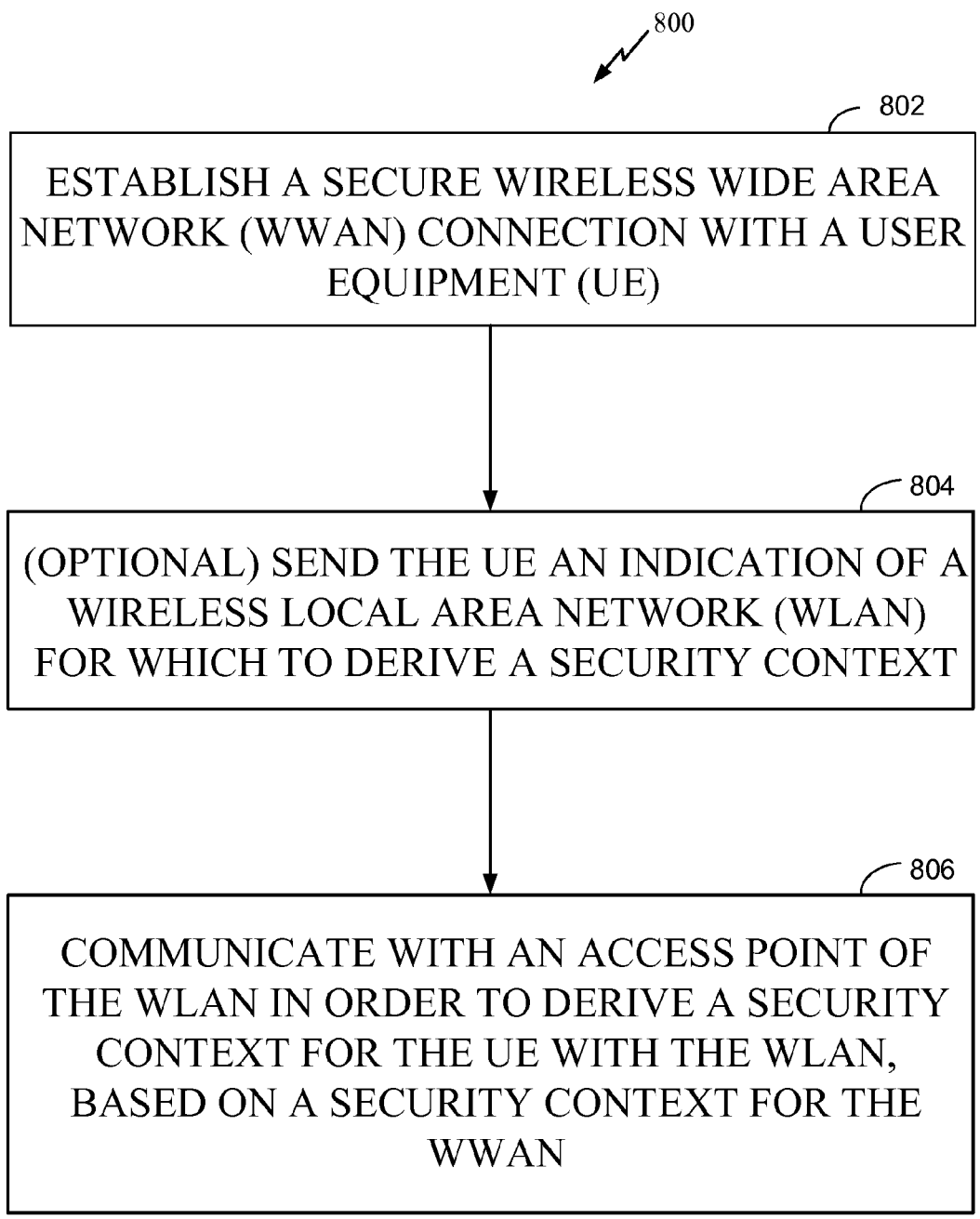
FIG. 8 illustrates example operations for secured wireless communications performed, for example, by a base station of a wireless wide area network (WWAN), in accordance with certain aspects of the present disclosure.

FIG. 8 illustrates corresponding example operations 800 for secure wireless communications that may be performed, for example, by a WWAN base station (e.g., eNB 404 shown in FIG. 4), in accordance with certain aspects of the present disclosure. The operations 800 may begin, at 802, by establishing a secure WWAN connection with a UE.

At 804, the WWAN base station may send the UE an indication of a WLAN for which to derive a security context. This communication may include the specific WLAN access point to associate with or the index of the WWAN security context to derive the WLAN security context from.

At 806, the WWAN base station may communicate with an access point of the WLAN in order to derive the security context for the UE with the WLAN, based on a security context for the WWAN.

Figure 9:
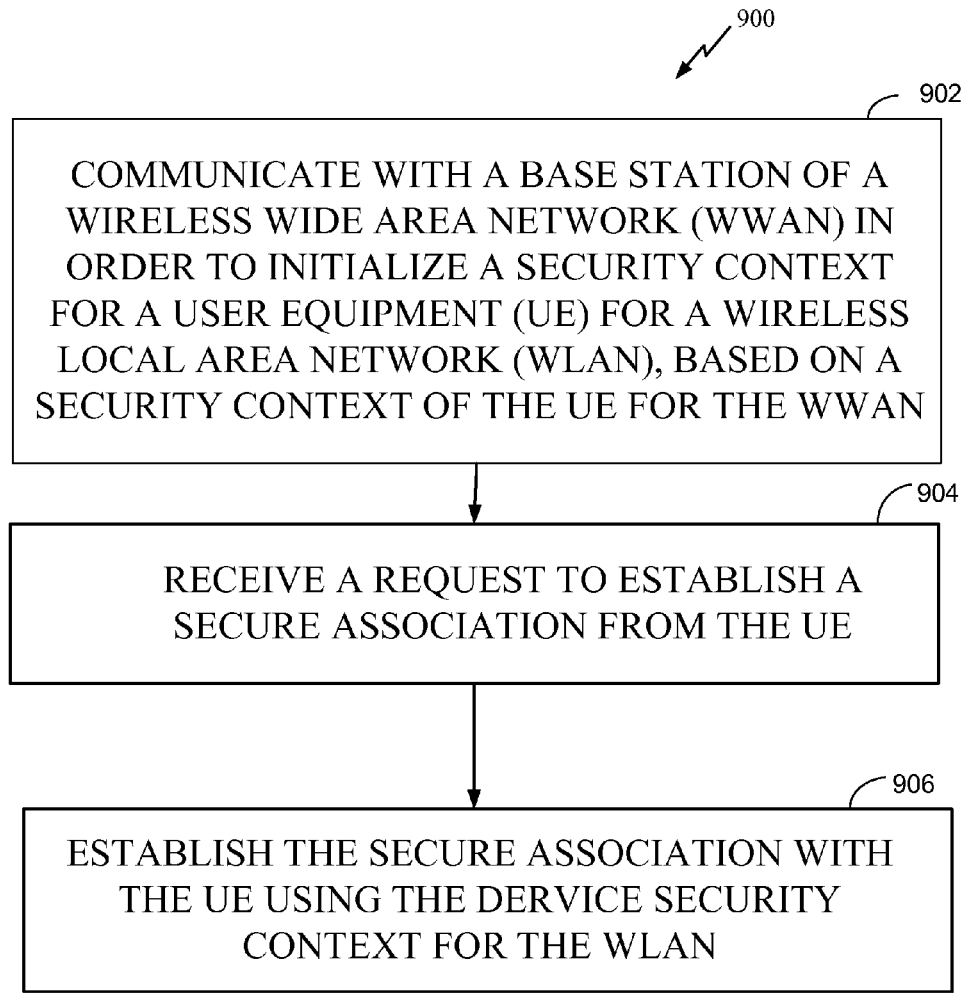
FIG. 9 illustrates example operations for secured wireless communications performed, for example, by a base station of a WLAN, in accordance with certain aspects of the present disclosure.

FIG. 9 illustrates example operations 900 for secure wireless communications, in accordance with certain aspects of the present disclosure. The operations 900 may be performed, for example, by a WLAN access point (e.g., AP 406 shown in FIG. 4). The operations 900 may begin, at 902, by communicating with a base station of a WWAN in order to derive a security context for a UE for the WLAN, based on a security context of the UE for the WWAN.

At 904, the WLAN access point may receive a request to establish a secure association from the UE (e.g., from the STA within the UE).

At 906, the WLAN base station may establish the secure association with the UE using the derived security context for the WLAN.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method for secure wireless communications by a user equipment (UE), comprising:
    establishing a secure connection with a wireless wide area network (WWAN) via an eNode B (eNB) that shares a secure network with a wireless local area network (WLAN) access point (AP);
    deriving a security context for the WLAN, based on a security context for the WWAN, wherein the security context for the WLAN comprises a first Pairwise Master Key (PMK) that matches a second PMK derived at the eNB and passed from the eNB to the WLAN AP; and
    establishing a secure association with the WLAN using the first PMK.

2. The method of claim 1, further comprising receiving from the WWAN an indication of the WLAN for which to derive the security context.

3. The method of claim 1, wherein:
    the security context for the WWAN comprises an eNB key or an Access Security Management Entity (ASME) key, and
    a Key Derivation Function (KDF) is used to derive the first PMK.

4. The method of claim 1, further comprising receiving a message from eNB comprising an indication to establish the secure association with the WLAN.

5. The method of claim 1, further comprising receiving a message from the eNB comprising an indication that the security context for the WLAN should be derived from the security context for the WWAN.

6. The method of claim 4, wherein the message comprises an indication that the security context for the WLAN should be derived from the security context for the WWAN.

7. The method of claim 5, wherein the indication comprises a vendor specific extension.

8. The method of claim 1, further comprising:
    receiving a changed security context for the WWAN from the eNB,
    deriving a third PMK for the WLAN if the security context for the WWAN changes while the UE is associated with the WLAN, wherein the third PMK is derived based on the changed security context for the WWAN; and
    sending an indication to the eNB to derive a fourth PMK based on the changed security context for the WWAN and to provide the fourth PMK to the WLAN.

9. The method of claim 8, wherein the third and fourth PMKs are derived from the changed security context for WWAN by using a KDF, and wherein the third PMK matches the fourth PMK.

10. The method of claim 1, further comprising using Wireless Protected Access (WPA) for securing traffic using the derived PMK as a root for deriving temporal keys.

11. The method of claim 1, wherein the secure association comprises a Robust Security Network Association (RSNA).

12. The method of claim 1, wherein the security context for the WLAN is derived prior to the UE sending an association request message to the WLAN AP.

13. An apparatus for secure wireless communications by a user equipment (UE), comprising:
    means for establishing a secure connection with a wireless wide area network (WWAN) via an eNode B (eNB) that shares a secure network with a wireless local area network (WLAN) access point (AP);
    means for deriving a security context for the WLAN, based on a security context for the WWAN, wherein the security context for the WLAN comprises a first Pairwise Master Key (PMK) that matches a second PMK derived at the eNB and passed from the eNB to the WLAN AP; and
    means for establishing a secure association with the WLAN using the first PMK.

14. The apparatus of claim 13, further comprising means for receiving from the WWAN an indication of the WLAN for which to derive the security context.

15. The apparatus of claim 13, wherein:
    the security context for the WWAN comprises an eNB key or an Access Security Management Entity (ASME) key, and
    a Key Derivation Function (KDF) is used to derive the first PMK.

16. The apparatus of claim 13, further comprising means for receiving a message from the eNB comprising an indication to establish the secure association with the WLAN.

17. The apparatus of claim 13, further comprising means for receiving a message from the eNB comprising an indication that the security context for the WLAN should be derived from the security context for the WWAN.

18. The apparatus of claim 16, wherein the message comprises an indication that the security context for the WLAN should be derived from the security context for the WWAN.

19. The apparatus of claim 17, wherein the indication comprises a vendor specific extension.

20. The apparatus of claim 13, wherein the security context for the WLAN is derived prior to the UE sending an association request message to the WLAN AP.

21. The apparatus of claim 13, further comprising:
    means for receiving a changed security context for the WWAN from the eNB,
    means for deriving a third PMK for the WLAN if the security context for the WWAN changes while the UE is associated with the WLAN, wherein the third PMK is derived based on the changed security context for the WWAN; and
    means for sending an indication to the eNB to derive a fourth PMK based on the changed security context for the WWAN and to provide the fourth PMK to the WLAN.

22. The apparatus of claim 21, wherein the third and fourth PMKs are derived from the changed security context for WWAN by using a KDF, and wherein the third PMK matches the fourth PMK.

23. The apparatus of claim 13, further comprising means for using Wireless Protected Access (WPA) for securing traffic using the derived PMK as a root for deriving temporal keys.

24. The apparatus of claim 13, wherein the secure association comprises a Robust Security Network Association (RSNA).

25. An apparatus for secure wireless communications by a user equipment (UE), comprising:
    at least one processor configured to:
        establish a secure connection with a wireless wide area network (WWAN) via an eNode B (eNB) that shares a secure network with a wireless local area network (WLAN) access point (AP);
        derive a security context for the WLAN, based on a security context for the WWAN, wherein the security context for the WLAN comprises a first Pairwise Master Key (PMK) that matches a second PMK derived at the eNB and passed from the eNB to the WLAN AP; and establish a secure association with the WLAN using the first PMK; and a memory coupled with the at least one processor.

26. The apparatus of claim 25, wherein the at least one processor is further configured to receive from the WWAN an indication of the WLAN for which to derive the security context.

27. The apparatus of claim 25, wherein:

the security context for the WWAN comprises an eNB key or an Access Security Management Entity (ASME) key, and a Key Derivation Function (KDF) is used to derive the first PMK.

28. A non-transitory computer readable medium having computer executable instructions stored thereon for:

establishing a secure connection with a wireless wide area network (WWAN) via an eNode B (eNB) that shares a secure network with a wireless local area network (WLAN) access point (AP);

deriving a security context for the WLAN, based on a security context for the WWAN, wherein the security context for the WLAN comprises a first Pairwise Master Key (PMK) that matches a second PMK derived at the eNB and passed from the eNB to the WLAN AP; and establishing a secure association with the WLAN using the first PMK.

29. The non-transitory computer readable medium of claim 28, wherein the computer readable medium further has instructions stored thereon for receiving from the WWAN an indication of the WLAN for which to derive the security context.

30. The non-transitory computer readable medium of claim 28, wherein:

the security context for the WWAN comprises an eNB key or an Access Security Management Entity (ASME) key, and a Key Derivation Function (KDF) is used to derive the first PMK.

* * * * *